US012617623B2

(12) United States Patent
Xu

(10) Patent No.: US 12,617,623 B2
(45) Date of Patent: May 5, 2026

(54) STABLE GEAR SHAFT BOX PROCESSING AND POSITIONING APPARATUS

(71) Applicant: Ningbo Hengte Automobile Parts Co., Ltd., Ningbo City (CN)

(72) Inventor: Yong Xu, Ningbo City (CN)

(73) Assignee: NINGBO HENGTE AUTOMOBILE PARTS CO., LTD., Ningbo City (CN)

( * ) Notice: Subject to any disclaimer, the term of this patent is extended or adjusted under 35 U.S.C. 154(b) by 255 days.

(21) Appl. No.: 18/389,060

(22) Filed: Nov. 13, 2023

(65) Prior Publication Data

US 2025/0100803 A1      Mar. 27, 2025

(30) Foreign Application Priority Data

Sep. 22, 2023    (CN) .......................... 202311232587.4

(51) Int. Cl.
*B65G 15/12*        (2006.01)
*B23P 15/14*        (2006.01)
*B65G 47/24*        (2006.01)

(52) U.S. Cl.
CPC ............. *B65G 15/12* (2013.01); *B65G 47/24* (2013.01); *B23P 15/14* (2013.01); *B65G 2811/0626* (2013.01)

(58) Field of Classification Search
None
See application file for complete search history.

(56) References Cited

U.S. PATENT DOCUMENTS 11,745,226 B2 *    9/2023    Zhang ................... B65G 47/88
                                                209/577

* cited by examiner

*Primary Examiner* — Kavel Singh
(74) *Attorney, Agent, or Firm* — Wood, Phillips, Katz, Clark & Mortimer

(57)            ABSTRACT

The present disclosure relates to the technical field of gear shaft box processing, and discloses a stable gear shaft box processing and positioning apparatus, including a frame. The frame is provided with a first conveying belt and a second conveying belt. The first conveying belt is provided with a material transfer plate, the material transfer plate is provided with a limiting slot, and a component to be assembled is arranged at the limiting slot. In the present disclosure, the material transfer plate, a first connecting seat and a second connecting seat are arranged to transport materials. In this technical solution, in the early stage of assembly, the transportation of the component to be assembled is completed together by the first conveying belt and the second conveying belt.

8 Claims, 5 Drawing Sheets

STABLE GEAR SHAFT BOX PROCESSING AND POSITIONING APPARATUS

TECHNICAL FIELD

The present disclosure relates to the technical field of gear shaft box processing, and particularly relates to a stable gear shaft box processing and positioning apparatus.

BACKGROUND ART

A gear shaft box is generally composed of a box and a box cover. During processing, first, a gear shaft is assembled into the box, and then, the box and the box cover are assembled together. A conventional assembly method is as follows: first, the box with an upward opening is placed on a conveying belt, then, the gear shaft is assembled into the box manually or by a manipulator, and subsequently, the box cover and the box are combined together and fixed through screws. In most cases, after the combination of the box and the box cover is completed, except for the two ends, all other four surfaces have fixing screws that need to be tightened. Therefore, after the fixation of the box and the box cover is completed, the position of the box needs to be adjusted to install screws which are originally located at the bottom of the box. The volume of the gear shaft box is generally larger, so it is necessary to provide a high-power adjusting mechanism to adjust the gear shaft box, resulting in higher energy consumption and increased expenditure on equipment cost.

SUMMARY OF THE INVENTION

The present disclosure provides a stable gear shaft box processing and positioning apparatus which has the beneficial effect of conveniently adjusting the angle of a component to be assembled, and solves the problems mentioned in the above background art that after the fixation of a box and a box cover is completed, the position of the box needs to be adjusted to install screws which are originally located at the bottom of the box, and the volume of a gear shaft box is generally larger, so it is necessary to provide a high-power adjusting mechanism to adjust the gear shaft box, resulting in higher energy consumption and increased expenditure on equipment cost.

The present disclosure provides the following technical solution: a stable gear shaft box processing and positioning apparatus includes a frame, where the frame is provided with a first conveying belt and a second conveying belt; the first conveying belt is provided with a material transfer plate, the material transfer plate is provided with a limiting slot, and a component to be assembled is arranged at the limiting slot;

the second conveying belt is provided with a first connecting seat, and one end of the first connecting seat is provided with a second connecting seat; the first connecting seat is fixedly connected to the second conveying belt, and the second connecting seat is rotationally connected to the material transfer plate; a side edge of the frame is provided with a buffer assembly, and the buffer assembly includes a fixing frame; the fixing frame is fixedly connected to the frame, and the fixing frame is provided with a buffer mechanism; and one side of the fixing frame is provided with a first limiting mechanism for limiting the connecting seat.

As an optional solution of the stable gear shaft box processing and positioning apparatus according to the present disclosure, where the first limiting mechanism includes a transmission seat, the transmission seat is elastically connected to the frame through a first return spring, and an upper end of the transmission seat is provided with a pressing plate.

As an optional solution of the stable gear shaft box processing and positioning apparatus according to the present disclosure, where the pressing plate is elastically connected to the transmission seat through a support spring, the pressing plate is provided with a guide rod, and the guide rod is slidably connected to the transmission seat.

As an optional solution of the stable gear shaft box processing and positioning apparatus according to the present disclosure, where one end of the fixing frame is provided with a first transmission rod, and the first transmission rod is fixedly connected to the fixing frame through a first spring; one side of the transmission seat is provided with an extended protrusion, and the position of the extended protrusion is opposite to the position of the first transmission rod; and one end of the extended protrusion is provided with an inclined plane.

As an optional solution of the stable gear shaft box processing and positioning apparatus according to the present disclosure, where the frame is provided with a transmission seat limiting mechanism, and the transmission seat limiting mechanism includes a limiting plate; the limiting plate is elastically connected to the frame through a second return spring, and one side of the limiting plate is provided with a limiting protrusion; and one side of the transmission seat is provided with a plurality of limiting grooves corresponding to the limiting protrusion.

As an optional solution of the stable gear shaft box processing and positioning apparatus according to the present disclosure, where one end of the fixing frame away from the first transmission rod is provided with a second transmission rod for adjusting the limiting plate, the second transmission rod is elastically connected to the fixing frame through a second spring, and the position of the second transmission rod is opposite to the position of the limiting plate.

As an optional solution of the stable gear shaft box processing and positioning apparatus according to the present disclosure, where the first connecting seat is elastically connected to the second connecting seat through a third spring, one end of the first connecting seat is provided with an extension rod, and the extension rod is slidably connected to the second connecting seat.

As an optional solution of the stable gear shaft box processing and positioning apparatus according to the present disclosure, where the component to be assembled includes a box and a box cover, one end of the box is embedded in the limiting slot, one end of the box cover is embedded with the box, and the material transfer plate is provided with a limiting seat for limiting the box cover.

As an optional solution of the stable gear shaft box processing and positioning apparatus according to the present disclosure, where the limiting seat is n-shaped, and an end of the limiting seat is inserted on the material transfer plate; the material transfer plate is provided with a limiting post, and the limiting post is elastically connected to the material transfer plate through a fourth spring; and an end of the limiting seat is provided with an inserting hole corresponding to the limiting post.

As an optional solution of the stable gear shaft box processing and positioning apparatus according to the present disclosure, where the buffer mechanism includes a cylinder, and a piston is arranged in the cylinder; the piston is provided with a piston rod, and the piston rod is elastically connected to the cylinder through a third return spring; and one side of the cylinder is provided with an exhaust hole.

The present disclosure has the following beneficial effects:

1. According to the stable gear shaft box processing and positioning apparatus, the material transfer plate, the first connecting seat and the second connecting seat are arranged to transport materials, and the material transfer plate is provided with the limiting slot to conveniently complete the fixation and positioning of workpieces. After the assembly of the component to be assembled is completed, the position of the component to be assembled needs to be adjusted and fixed through screws. In this technical solution, in the early stage of assembly, the transportation of the component to be assembled is completed together by the first conveying belt and the second conveying belt. When the assembly is completed and the fixation is needed, as the component to be assembled moves, the component to be assembled is transported only by the second conveying belt. Due to the loss of the carrying of the first conveying belt, the material transfer plate will deflect, and then, the angle adjustment of the component to be assembled is completed automatically. An adjusting mechanism is saved, thereby effectively reducing the equipment cost and being more energy-saving and environment-friendly.

2. According to the stable gear shaft box processing and positioning apparatus, one side of the fixing frame is provided with the first limiting mechanism, the first limiting mechanism includes the transmission seat, and the transmission seat is provided with the extended protrusion. Correspondingly, the fixing frame is provided with the first transmission rod, and the first transmission rod is fixedly connected to the fixing frame through the first spring. When the material transfer plate deflects, the material transfer plate will be in contact with the first transmission rod. Under the contact of the material transfer plate, the first transmission rod will move to the direction of the transmission seat and be in contact with the extended protrusion. The extended protrusion is provided with the inclined plane. Under the push of the first transmission rod, the extended protrusion will move downwards with the transmission seat. Driven by the transmission seat, the pressing plate is in contact with the second connecting seat. The presence of the pressing plate can offset partial impact of the material transfer plate on the second connecting seat during deflection, thereby effectively prolonging the service life of the second conveying belt.

3. According to the stable gear shaft box processing and positioning apparatus, the frame is provided with the transmission seat limiting mechanism which includes the limiting plate, the limiting plate is provided with the limiting protrusion, and the transmission seat is provided with the limiting grooves corresponding to the limiting protrusion. When the limiting groove is opposite to the limiting protrusion, the limiting protrusion will be inserted into the limiting groove. An upper end of the limiting protrusion is provided with the inclined plane. When the transmission seat moves downwards, the presence of the limiting protrusion will not affect the movement of the transmission seat. When the transmission seat moves upwards, under the action of the limiting groove and the limiting protrusion, the transmission seat cannot move. The presence of the limiting groove and the limiting protrusion allows the transmission seat to only move downwards in one direction. In this way, when the pressing plate is in contact with the second connecting seat, even if the impact force is larger, the pressing plate will not move with the transmission seat, thereby effectively ensuring the limiting effect of the first limiting mechanism on the second connecting seat.

In figures: 1. frame; 2. first conveying belt; 3. second conveying belt; 4. material transfer plate; 401. limiting slot; 402. limiting post; 403. fourth spring; 5. first connecting seat; 501. third spring; 502. extension rod; 6. second connecting seat; 7. fixing frame; 701. first transmission rod; 702. first spring; 8. transmission seat; 801. pressing plate; 802. support spring; 803. guide rod; 804. extended protrusion; 805. limiting groove; 9. limiting plate; 901. limiting protrusion; 10. second return spring; 11. second transmission rod; 12. second spring; 13. box; 14. box cover; 15. limiting seat; 1501. inserting hole; 16. cylinder; 17. piston; 18. piston rod; 19. third return spring; 20. exhaust hole; and 21. first return spring.

DETAILED DESCRIPTION OF THE INVENTION

The technical solutions in the embodiments of the present disclosure will be clearly and completely described below with reference to the accompanying drawings in the embodiments of the present disclosure. Apparently, the described embodiments are merely a part rather than all of the embodiments of the present disclosure. All other embodiments obtained by a person of ordinary skill in the art on the basis of the embodiments in the present disclosure without creative efforts shall fall within the protection scope of the present disclosure.

Embodiment 1

Figure 1:
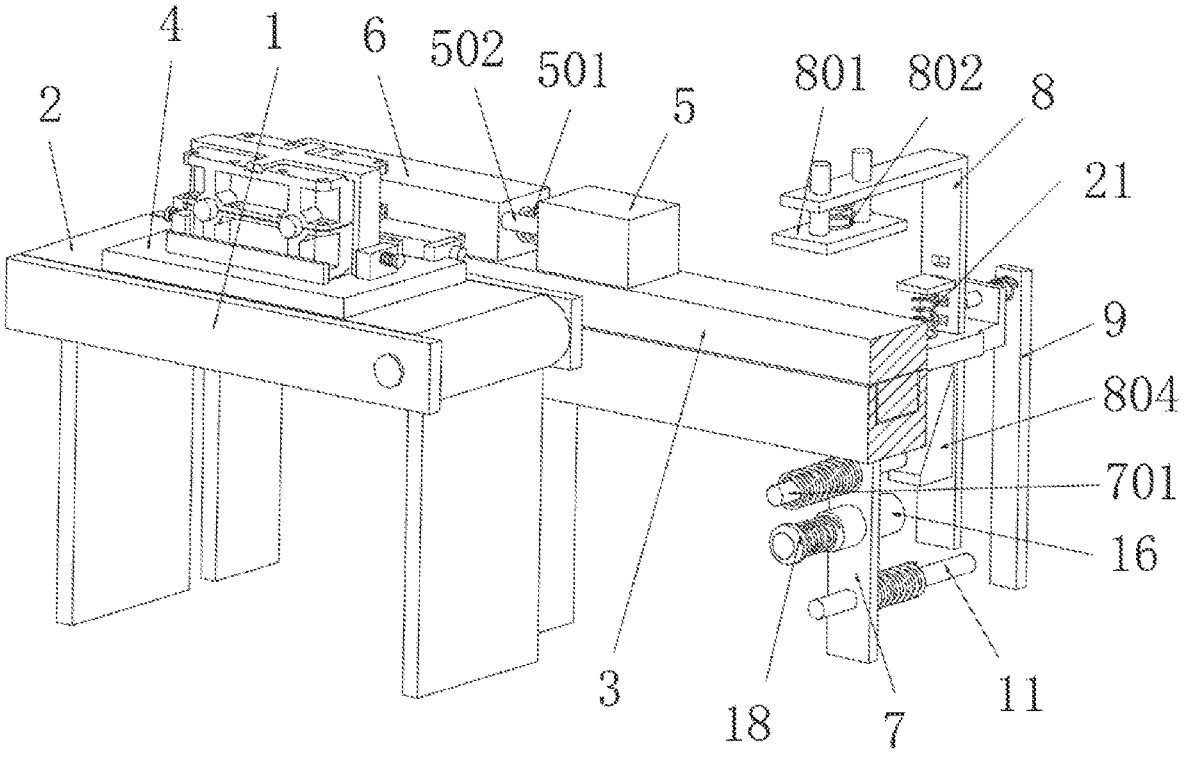
FIG. 1 is a schematic structural diagram of the present disclosure.
Figure 2:
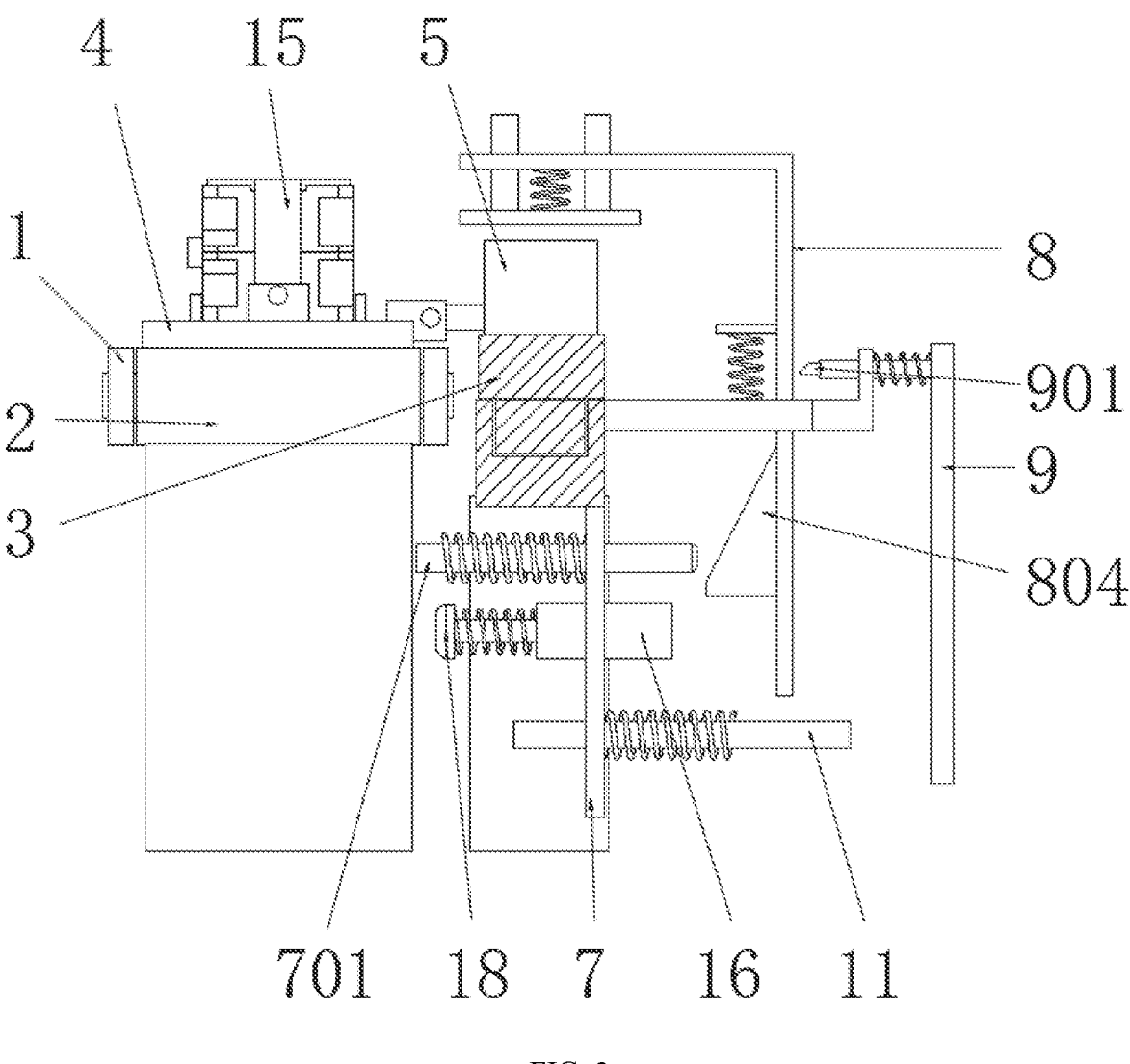
FIG. 2 is a front view of the present disclosure.
Figure 3:
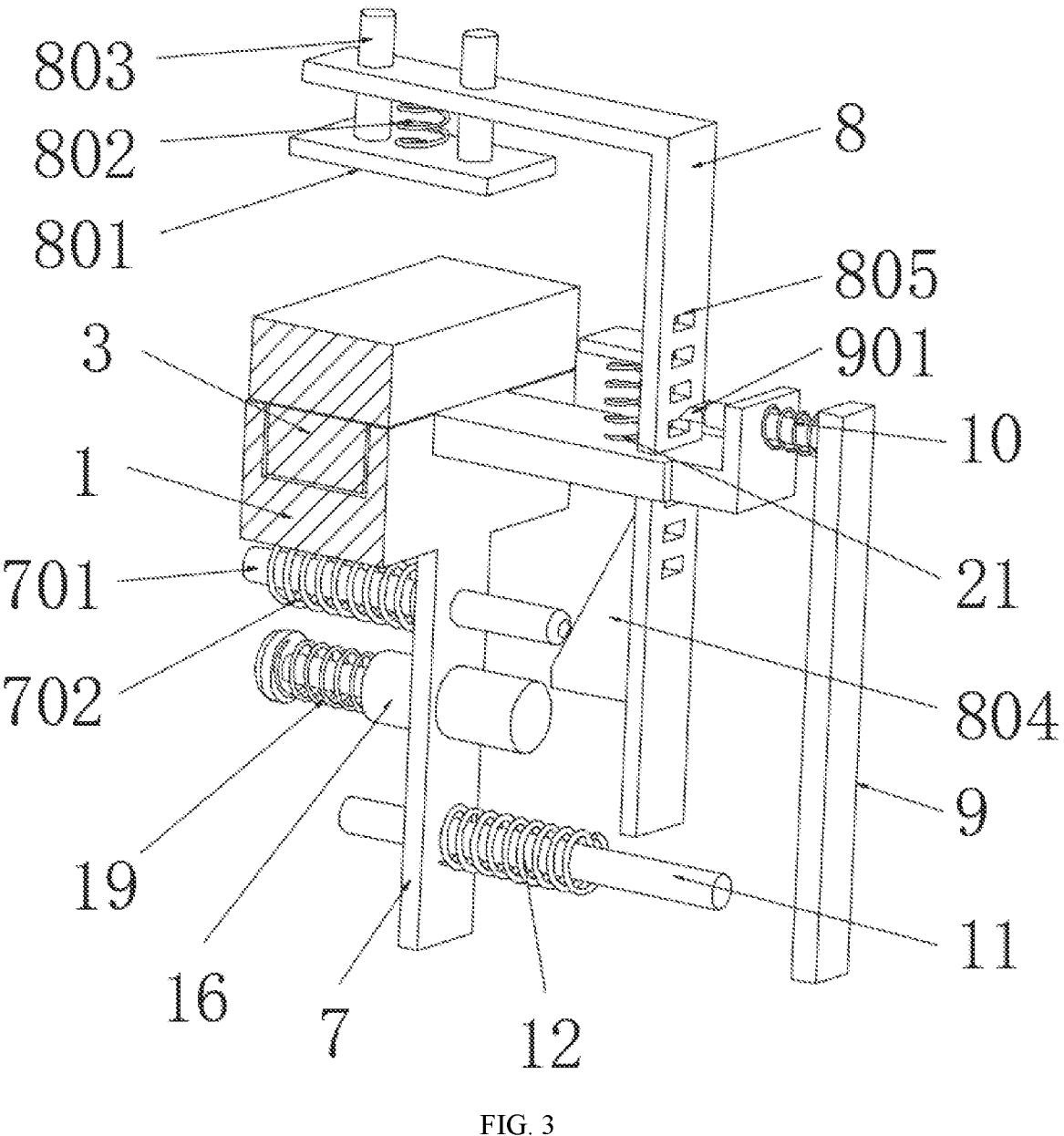
FIG. 3 is a schematic structural diagram of a first limiting mechanism of the present disclosure.
Figure 4:
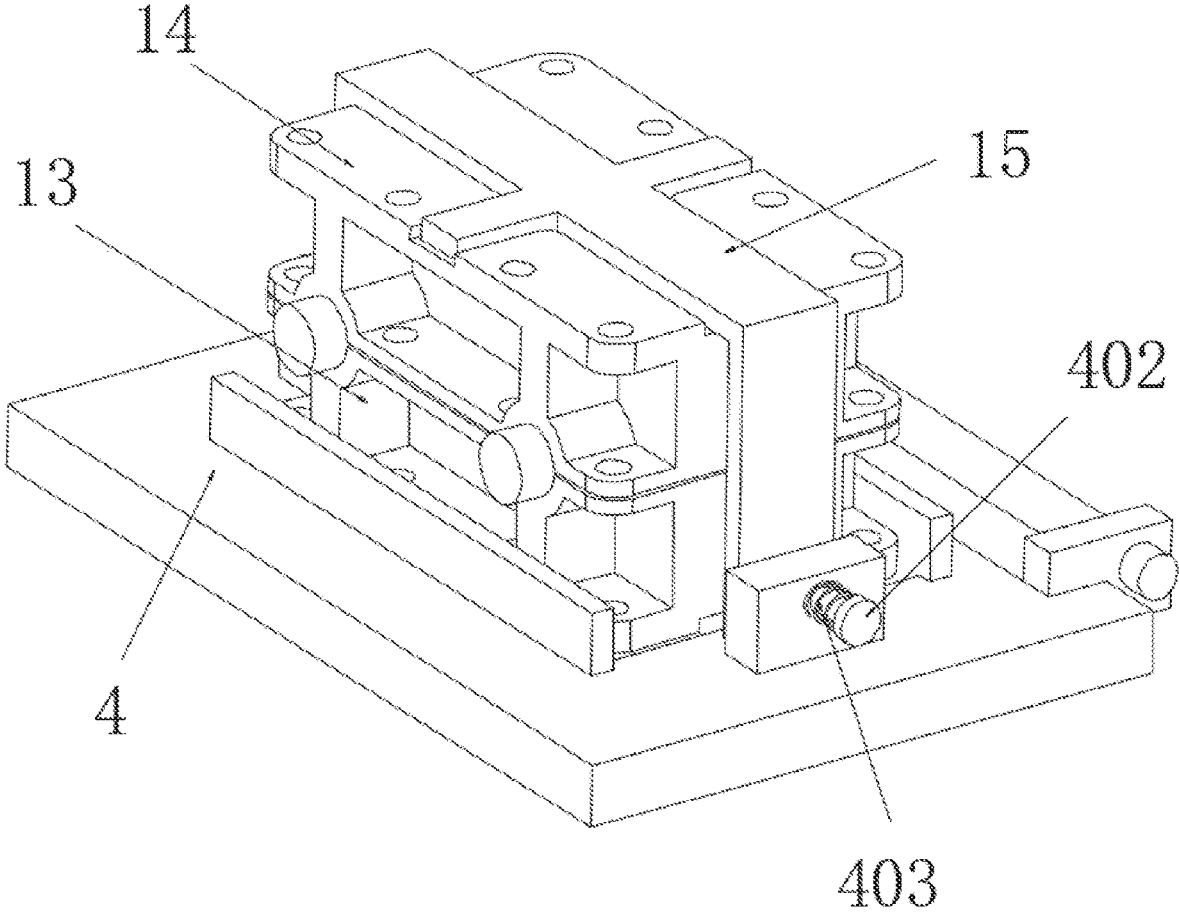
FIG. 4 is a schematic structural diagram of a component to be assembled of the present disclosure.
Figure 5:
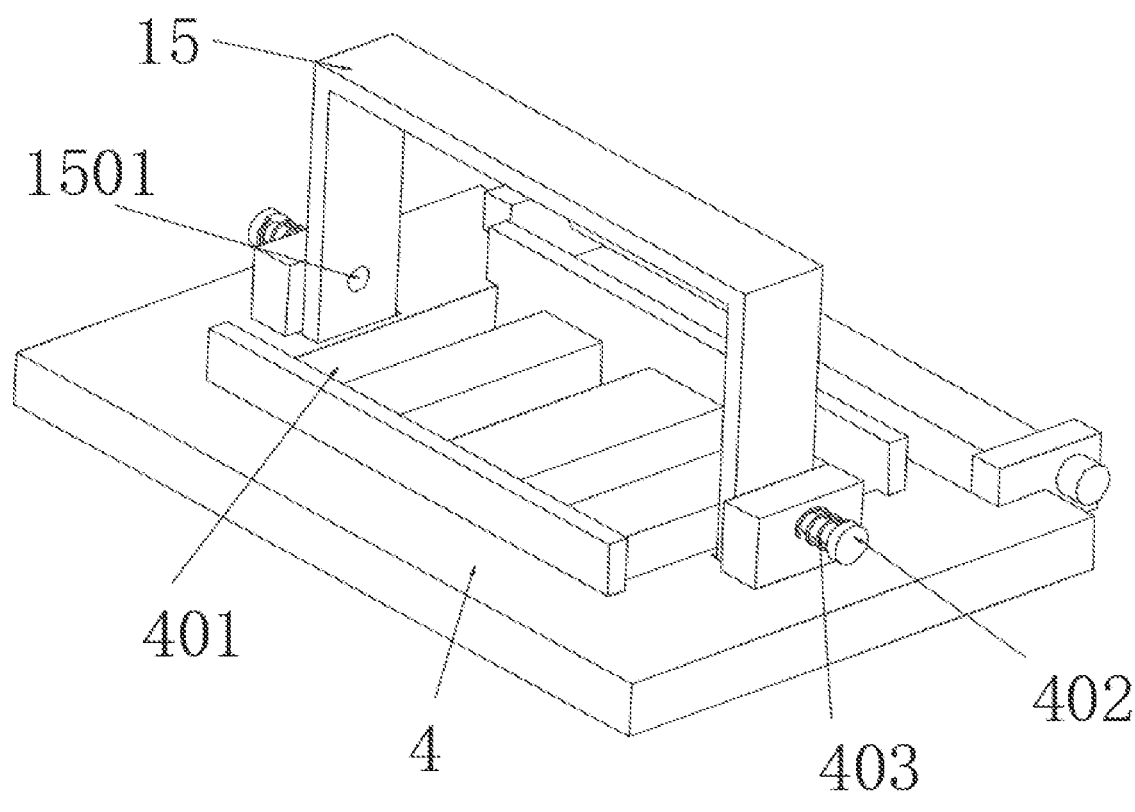
FIG. 5 is a schematic structural diagram of a material transfer plate of the present disclosure.
Figure 6:
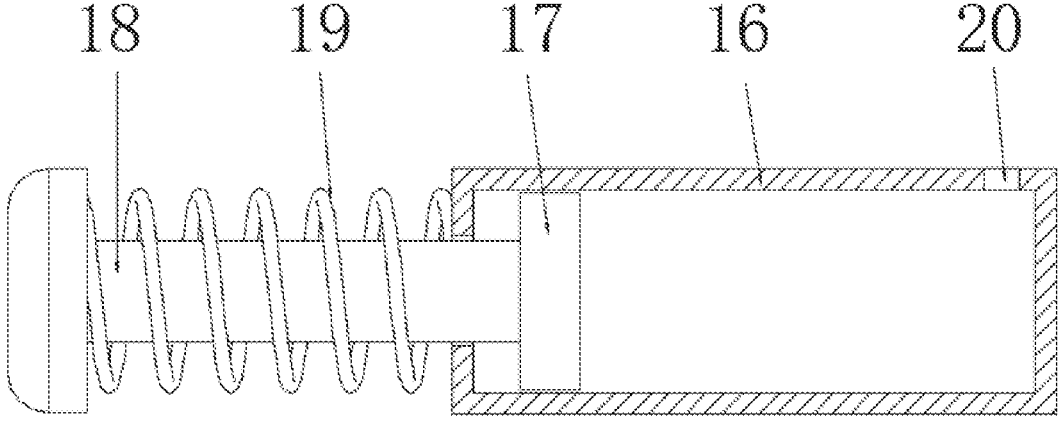
FIG. 6 is a schematic diagram of an internal structure of a cylinder of the present disclosure.

Referring to FIG. 1 to FIG. 6, the present disclosure discloses a stable gear shaft box processing and positioning apparatus, including a frame 1. The frame 1 is provided with a first conveying belt 2 and a second conveying belt 3. The first conveying belt 2 is provided with a material transfer plate 4, the material transfer plate 4 is provided with a limiting slot 401, and a component to be assembled is arranged at the limiting slot 401.

The second conveying belt 3 is provided with a first connecting seat 5, and one end of the first connecting seat 5 is provided with a second connecting seat 6. The first connecting seat 5 is fixedly connected to the second conveying belt 3, and the second connecting seat 6 is rotationally connected to the material transfer plate 4. A side edge of the frame 1 is provided with a buffer assembly, and the buffer assembly includes a fixing frame 7. The fixing frame 7 is fixedly connected to the frame 1, and the fixing frame 7 is provided with a buffer mechanism. One side of the fixing frame 7 is provided with a first limiting mechanism for limiting the second connecting seat 6.

The buffer mechanism includes a cylinder 16, and a piston 17 is arranged in the cylinder 16. The piston 17 is provided with a piston rod 18, and the piston rod 18 is elastically connected to the cylinder 16 through a third return spring 19. One side of the cylinder 16 is provided with an exhaust hole 20.

In this technical solution, by arranging the frame 1 with the first conveying belt 2 and the second conveying belt 3 as well as the material transfer plate 4 and the first connecting seat 5 used in conjunction with the frame, driven by the first conveying belt 2, the material transfer plate 4 can move, and driven by the second conveying belt 3, the first connecting seat 5 can move. One end of the first connecting seat 5 is provided with the second connecting seat 6, and the second connecting seat 6 is rotationally connected to the material transfer plate 4.

Within a certain distance, the material transfer plate 4, the first connecting seat 5 and the second connecting seat 6 together play a role in transporting materials. As the materials move, the material transfer plate 4 reaches one end of the first conveying belt 2. At this time, the second conveying belt 3 continues to move with the first connecting seat 5 and the second connecting seat 6. Driven by the second connecting seat 6, the material transfer plate 4 falls from the first conveying belt 2. At this time, the material transfer plate 4 which is originally parallel to the ground will deflect by 90° and be perpendicular to the ground. As the material transfer plate 4 deflects, the position of the component to be assembled on the material transfer plate 4 will also change. In this way, the installation of screws at the top and bottom of the component to be assembled can be completed through electric screwdrivers on both sides of the frame 1, thereby greatly improving the installation efficiency.

In this technical solution, the material transfer plate 4, the first connecting seat 5 and the second connecting seat 6 are arranged to transport materials, and the material transfer plate 4 is provided with the limiting slot 401 to conveniently complete the fixation and positioning of the component to be assembled. During processing, the box 13 is directly placed in the limiting slot 401, and then, the box cover 14 is embedded with the box 13. After the assembly of the component to be assembled is completed, the position of the component to be assembled needs to be adjusted and fixed through screws. In this technical solution, in the early stage of assembly, the transportation of the component to be assembled is completed together by the first conveying belt 2 and the second conveying belt 3. When the assembly is completed and the fixation is needed, as the component to be assembled moves, the component to be assembled is transported only by the second conveying belt 3. Due to the loss of the carrying of the first conveying belt 2, the material transfer plate 4 will deflect, and then, the angle adjustment of the component to be assembled is completed automatically. An adjusting mechanism is saved, thereby effectively reducing the equipment cost and being more energy-saving and environment-friendly.

When the material transfer plate 4 deflects, the material transfer plate is easy to collide with the frame 1 under the action of inertia. Therefore, in this technical solution, the frame 1 is provided with the buffer mechanism. After the material transfer plate 4 falls from the first conveying belt 2, the material transfer plate will be in contact with the buffer mechanism. Under the action of the buffer mechanism, the material transfer plate 4 and the component to be assembled can more stably complete angle adjustment.

Specific working principle: The buffer mechanism includes the cylinder 16, the movable piston 17 is arranged in the cylinder 16, the piston 17 is provided with the piston rod 18, and one side of the cylinder 16 is provided with the exhaust hole 20. When the material transfer plate 4 deflects, the material transfer plate will be in contact with the piston rod 18. Under the push of the material transfer plate 4, the piston rod 18 overcomes the resistance of the third return spring 19 and pushes the piston 17 to move. As the piston 17 moves, the air in the cylinder 16 is discharged through the exhaust hole 20. Since the discharge of the air requires a certain time, the presence of the buffer mechanism can achieve a certain delaying effect on the movement of the material transfer plate 4.

Embodiment 2

This embodiment is improved and described on the basis of Embodiment 1. Specifically, referring to FIG. 1 to FIG. 6, the first limiting mechanism includes a transmission seat 8, the transmission seat 8 is elastically connected to the frame 1 through a first return spring 21, and an upper end of the transmission seat 8 is provided with a pressing plate 801.

The pressing plate 801 is elastically connected to the transmission seat 8 through a support spring 802, the pressing plate 801 is provided with a guide rod 803, and the guide rod 803 is slidably connected to the transmission seat 8.

One end of the fixing frame 7 is provided with a first transmission rod 701, and the first transmission rod 701 is fixedly connected to the fixing frame 7 through a first spring 702. One side of the transmission seat 8 is provided with an extended protrusion 804, and the position of the extended protrusion 804 is opposite to the position of the first transmission rod 701. One end of the extended protrusion 804 is provided with an inclined plane.

Due to the larger weight of the material transfer plate 4 and the component to be assembled, when the material transfer plate 4 deflects, the material transfer plate will cause larger impact on the first connecting seat 5, the second connecting seat 6 and the second conveying belt 3. In order to solve the above problem, in this technical solution, one side of the fixing frame 7 is provided with the first limiting mechanism, the first limiting mechanism includes the transmission seat 8, and the transmission seat 8 is provided with the extended protrusion 804. Correspondingly, the fixing frame 7 is provided with the first transmission rod 701, and the first transmission rod 701 is fixedly connected to the fixing frame 7 through the first spring 702. When the material transfer plate 4 deflects, the material transfer plate will be in contact with the first transmission rod 701. Under the contact of the material transfer plate 4, the first transmission rod 701 will move to the direction of the transmission seat 8 and be in contact with the extended protrusion 804. The extended protrusion 804 is provided with the inclined plane. Under the push of the first transmission rod 701, the extended protrusion 804 will move downwards with the transmission seat 8. Driven by the transmission seat 8, the pressing plate 801 is in contact with the second connecting seat 6. The presence of the pressing plate 801 can offset partial impact of the material transfer plate 4 on the second connecting seat 6 and the second conveying belt 3 during deflection, thereby effectively prolonging the service life of the second conveying belt 3.

Embodiment 3

This embodiment is improved and described on the basis of Embodiment 1. Specifically, referring to FIG. 1 to FIG. 6, the frame 1 is provided with a transmission seat limiting mechanism, and the transmission seat limiting mechanism includes a limiting plate 9. The limiting plate 9 is elastically connected to the frame 1 through a second return spring 10, and one side of the limiting plate 9 is provided with a limiting protrusion 901. One side of the transmission seat 8 is provided with a plurality of limiting grooves 805 corresponding to the limiting protrusion 901.

One end of the fixing frame 7 away from the first transmission rod 701 is provided with a second transmission rod 11 for adjusting the limiting plate 9, the second transmission rod 11 is elastically connected to the fixing frame 7 through a second spring 12, and the position of the second transmission rod 11 is opposite to the position of the limiting plate 9.

The first connecting seat 5 is elastically connected to the second connecting seat 6 through a third spring 501, one end of the first connecting seat 5 is provided with an extension rod 502, and the extension rod 502 is slidably connected to the second connecting seat 6.

Since the transmission seat 8 can move up and down, in order to prevent the transmission seat 8 from shaking when a force is applied, in this technical solution, the frame 1 is further provided with the transmission seat limiting mechanism which includes the limiting plate 9, the limiting plate 9 is provided with the limiting protrusion 901, and the transmission seat 8 is provided with the limiting grooves 805 corresponding to the limiting protrusion 901. When the limiting groove 805 is opposite to the limiting protrusion 901, the limiting protrusion 901 will be inserted into the limiting groove 805. An upper end of the limiting protrusion 901 is provided with an inclined plane. When the transmission seat 8 moves downwards, the presence of the limiting protrusion 901 will not affect the movement of the transmission seat 8. When the transmission seat 8 moves upwards, under the action of the limiting groove 805 and the limiting protrusion 901, the transmission seat 8 cannot move. The presence of the limiting groove 805 and the limiting protrusion 901 allows the transmission seat 8 to only move downwards in one direction. In this way, when the pressing plate 801 is in contact with the second connecting seat 6, even if the impact force is larger, the pressing plate will not move with the transmission seat 8, thereby effectively ensuring the limiting effect of the first limiting mechanism on the second connecting seat 6.

The fixing frame is further provided with the second transmission rod 11. When the material transfer plate 4 deflects, the material transfer plate will be first in contact with the first transmission rod 701, then in contact with the buffer mechanism, and finally in contact with the second transmission rod 11. When the material transfer plate 4 is in contact with the second transmission rod 11, the second transmission rod 11 will be pushed to move. At this time, the second transmission rod 11 will be in contact with the limiting plate 9, and under the push of the second transmission rod 11, the limiting plate 9 will carry the limiting protrusion 901 away from the transmission seat 8. At this time, the limiting protrusion 901 is separated from the limiting groove 805, and the transmission seat 8 can move freely.

The second conveying belt 3 operates continuously during operation. By arranging the fixing frame 7 with the second transmission rod 11, when the material transfer plate 4 is adjusted in place, the material transfer plate will release the limit of the transmission seat limiting mechanism on the transmission seat 8 through the second transmission rod 11. As the material transfer plate 4 moves, the material transfer plate will be misaligned with the first transmission rod 701 and the buffer mechanism. In this way, the first limiting mechanism will no longer limit the second connecting seat 6, and the material transfer plate 4 can move freely.

Embodiment 4

This embodiment is improved and described on the basis of Embodiment 1. Specifically, referring to FIG. 1 to FIG. 6, the component to be assembled includes a box 13 and a box cover 14, one end of the box 13 is embedded in the limiting slot 401, one end of the box cover 14 is embedded with the box 13, and the material transfer plate 4 is provided with a limiting seat 15 for limiting the box cover 14.

The limiting seat 15 is n-shaped, and an end of the limiting seat 15 is inserted on the material transfer plate 4. The material transfer plate 4 is provided with a limiting post 402, and the limiting post 402 is elastically connected to the material transfer plate 4 through a fourth spring 403. An end of the limiting seat 15 is provided with an inserting hole 1501 corresponding to the limiting post 402.

Since the second conveying belt 3 operates continuously during operation, in this technical solution, the second conveying belt 3 is provided with the first connecting seat 5 and the second connecting seat 6 in coordination with the second conveying belt to work, the first connecting seat 5 is fixedly connected to the second conveying belt 3, and the second connecting seat 6 is slidably connected to the second conveying belt 3. When the material transfer plate deflects, the second connecting seat 6 will be limited by the first limiting mechanism. At this time, the first connecting seat 5 continues to move, and the second connecting seat 6 remains stationary in the early stage. When the third spring 501 cannot be further stretched, the second connecting seat 6 will overcome the frictional force with the pressing plate 801 and continue to move, thus the operation of the second conveying belt 3 cannot be affected.

The limiting seat 15 is detachable. During assembly, first, the box 13 is placed in the limiting slot 401, then, the box cover 14 is embedded with the box 13, and subsequently, the limiting seat 15 is installed on the material transfer plate 4. The box cover 14 and the box 13 are fixed through the limiting seat 15 to prevent the box cover and the box from separating from the material transfer plate 4 when deflecting with the material transfer plate. When the limiting seat 15 needs to be disassembled, it is only necessary to pull the limiting post 402 to be separated from the inserting hole 1501 on the limiting seat 15.

It should be noted that in the article, the first, the second and other relational terms are used for distinguishing an entity or an operation from the other entities and operations only, not necessarily to require or imply any actual relationship or sequence between the entities or the operations; and the terms, such as "comprise", "comprising" or any other variant, are intended to cover non-exclusive comprising, so that processes, methods, goods or terminal devices containing a series of factors not only comprise the factors, but also comprise other factors which are not listed obviously, or comprise the inherent factors of the processes, the methods, the goods or the terminal devices.

The above is only the preferred implementations of the present disclosure herein. It is to be pointed out that those of ordinary skill in the art may further make a plurality of improvements and embellishments without departing from the technical principle of the present disclosure herein, and these improvements and embellishments should also fall within the scope of protection of the present disclosure herein.

What is claimed is:

1. A stable gear shaft box processing and positioning apparatus, comprising a frame (1), wherein the frame (1) is provided with a first conveying belt (2) and a second conveying belt (3); the first conveying belt (2) is provided with a material transfer plate (4), the material transfer plate (4) is provided with a limiting slot (401), and a component to be assembled is arranged at the limiting slot (401);

the second conveying belt (3) is provided with a first connecting seat (5), and one end of the first connecting seat (5) is provided with a second connecting seat (6); the first connecting seat (5) is fixedly connected to the second conveying belt (3), and the second connecting seat (6) is rotationally connected to the material transfer plate (4); a side edge of the frame (1) is provided with a buffer assembly, and the buffer assembly comprises a fixing frame (7); the fixing frame (7) is fixedly connected to the frame (1), and the fixing frame (7) is provided with a buffer mechanism;

and one side of the fixing frame (7) is provided with a first limiting mechanism for limiting the second connecting seat (6), wherein the first limiting mechanism comprises a transmission seat (8), the transmission seat (8) is elastically connected to the frame (1) through a first return spring (21), and an upper end of the transmission seat (8) is provided with a pressing plate (801), and further wherein the pressing plate (801) is elastically connected to the transmission seat (8) through a support spring (802), the pressing plate (801) is provided with a guide rod (803), and the guide rod (803) is slidably connected to the transmission seat (8).

2. The stable gear shaft box processing and positioning apparatus according to claim 1, wherein one end of the fixing frame (7) is provided with a first transmission rod (701), and the first transmission rod (701) is fixedly connected to the fixing frame (7) through a first spring (702); one side of the transmission seat (8) is provided with an extended protrusion (804), and the position of the extended protrusion (804) is opposite to the position of the first transmission rod (701); and one end of the extended protrusion (804) is provided with an inclined plane.

3. The stable gear shaft box processing and positioning apparatus according to claim 2, wherein the frame (1) is provided with a transmission seat limiting mechanism, and the transmission seat limiting mechanism comprises a limiting plate (9); the limiting plate (9) is elastically connected to the frame (1) through a second return spring (10), and one side of the limiting plate (9) is provided with a limiting protrusion (901); and one side of the transmission seat (8) is provided with a plurality of limiting grooves (805) corresponding to the limiting protrusion (901).

4. The stable gear shaft box processing and positioning apparatus according to claim 3, wherein one end of the fixing frame (7) away from the first transmission rod (701) is provided with a second transmission rod (11) for adjusting the limiting plate (9), the second transmission rod (11) is elastically connected to the fixing frame (7) through a second spring (12), and the position of the second transmission rod (11) is opposite to the position of the limiting plate (9).

5. The stable gear shaft box processing and positioning apparatus according to claim 4, wherein the first connecting seat (5) is elastically connected to the second connecting seat (6) through a third spring (501), one end of the first connecting seat (5) is provided with an extension rod (502), and the extension rod (502) is slidably connected to the second connecting seat (6).

6. The stable gear shaft box processing and positioning apparatus according to claim 5, wherein the component to be assembled comprises a box (13) and a box cover (14), one end of the box (13) is embedded in the limiting slot (401), one end of the box cover (14) is embedded with the box (13), and the material transfer plate (4) is provided with a limiting seat (15) for limiting the box cover (14).

7. The stable gear shaft box processing and positioning apparatus according to claim 6, wherein the limiting seat (15) is n-shaped, and an end of the limiting seat (15) is inserted on the material transfer plate (4); the material transfer plate (4) is provided with a limiting post (402), and the limiting post (402) is elastically connected to the material transfer plate (4) through a fourth spring (403); and an end of the limiting seat (15) is provided with an inserting hole (1501) corresponding to the limiting post (402).

8. The stable gear shaft box processing and positioning apparatus according to claim 7, wherein the buffer mechanism comprises a cylinder (16), and a piston (17) is arranged in the cylinder (16); the piston (17) is provided with a piston rod (18), and the piston rod (18) is elastically connected to the cylinder (16) through a third return spring (19); and one side of the cylinder (16) is provided with an exhaust hole (20).

* * * * *